(12) United States Patent
Kubo

(10) Patent No.: US 9,764,267 B2
(45) Date of Patent: Sep. 19, 2017

(54) AIR CLEANER AND AIR CONDITIONER HAVING AIR-CLEANING FUNCTION

(71) Applicant: Mitsubishi Electric Corporation, Tokyo (JP)

(72) Inventor: Kazuya Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 92 days.

(21) Appl. No.: 14/843,025

(22) Filed: Sep. 2, 2015

(65) Prior Publication Data

US 2016/0074792 A1   Mar. 17, 2016

(30) Foreign Application Priority Data

Sep. 16, 2014   (JP) .................................. 2014-188077

(51) Int. Cl.
*B01D 53/24*   (2006.01)
*B01D 46/00*   (2006.01)

(52) U.S. Cl.
CPC ....... *B01D 46/002* (2013.01); *B01D 46/0041* (2013.01); *B01D 2273/30* (2013.01)

(58) Field of Classification Search
CPC ............... B01D 53/24; B01D 2256/10; B01D 2256/12; B01D 2256/245;

(Continued)

(56) References Cited

U.S. PATENT DOCUMENTS 3,953,183 A * 4/1976 Regehr .................. B01D 45/16
                                                        55/440
4,778,029 A * 10/1988 Thornburgh ........... F02M 35/14
                                                        180/68.3

(Continued)

FOREIGN PATENT DOCUMENTS

JP    H10-264649 A    10/1998
JP    2006-263492 A   10/2006

OTHER PUBLICATIONS

Office Action mailed Jan. 24, 2017 issued in corresponding JP patent application No. 2014-188077 (and English translation).

*Primary Examiner* — Jacob T Minskey
*Assistant Examiner* — Minh-Chau Pham
(74) *Attorney, Agent, or Firm* — Posz Law Group, PLC

(57) ABSTRACT

Disclosed herein is an air cleaner, having at least one air inlet formed therein, includes a chassis having at least one air inlet passage inner peripheral surface formed therein, an air-sending device, a filter, and a front panel having at least one air inlet passage outer peripheral surface formed therein. An air inlet passage, providing communication between the air inlet and the filter, is formed between the air inlet passage inner peripheral surface and the air inlet passage outer peripheral surface. The air inlet passage inner peripheral surface and the air inlet passage outer peripheral surface have respective curvatures in a left-right direction, and the curvature of the air inlet passage inner peripheral surface is greater than that of the air inlet passage outer peripheral surface. The filter is composed of a central filter and side filters each having different catching targets, and the side filters are disposed on side surfaces of the central filter and closer to the respective air inlet passage inner peripheral surfaces than the central filter.

7 Claims, 1 Drawing Sheet

(58) Field of Classification Search
CPC ........ B01D 2257/304; B01D 2257/502; B01D 2257/504; B01D 2257/55; Y02E 50/346
USPC ......... 55/447, 467, 469, 471, 473, 460, 462, 55/451, 456, 459.1, 404, 408, 405, 406, 55/407; 95/271
See application file for complete search history.

(56) References Cited

U.S. PATENT DOCUMENTS

| | | | |
|---|---|---|---|
| 6,156,212 A * | 12/2000 | Rader | G01N 1/2211 209/143 |
| 8,357,232 B1 * | 1/2013 | Morrison | B01D 53/24 55/404 |
| 2004/0139709 A1 * | 7/2004 | Illingworth | A47L 5/24 55/406 |
| 2011/0139889 A1 * | 6/2011 | Ohtsuka | A01M 1/2033 239/34 |
| 2015/0305583 A1 * | 10/2015 | Jonsson | B04C 5/04 55/320 |

\* cited by examiner

AIR CLEANER AND AIR CONDITIONER HAVING AIR-CLEANING FUNCTION

TECHNICAL FIELD

The present invention relates to an air cleaner and an air conditioner having an air-cleaning function.

BACKGROUND ART

In recent years, environmental pollution, air pollution and adverse effects on human bodies caused by fine particles such as PM2.5, which are causative substances of air pollution, have become problems. As a solution of the problems, air cleaners are installed indoors to catch indoor fine particles.

In some conventional air cleaners, a HEPA filter or the like is disposed in an air inlet for catching fine particles. However, as soon as the filter catches coarse dust in air sucked from the air inlet, the filter is clogged, thereby degradation in air-conditioning performance frequently occurs. Therefore, frequent maintenance such as cleaning and replacement is required in order to eliminate the clogging. In some cases, although a charged filter and the like capable of selectively absorbing fine particles may be used so that the clogging is less likely to occur, there is a problem that adhesion of particles other than fine particles to the surface of the charged filter impedes the attraction force generated by charging and obstructs catching of fine particles.

Thus, techniques to solve the above problems have been proposed (for example, see Patent Literature 1).

In Patent Literature 1, an air cleaner is provided, comprising an air-sending device for circulating air; a filter unit disposed in a circulating flow of the air for catching dust in the air by a vertical dust-catching surface; and a guide path for guiding the air to the filter unit, wherein following the guide path, a rapid-turning part for the air flow and a coarse dust-accumulating part for receiving coarse dust separated from the air flow that has been turned rapidly are provided.

According to the air cleaner described in Patent Literature 1, since the air cleaner has a separation mechanism by which an air flow is rapidly turned to separate fine dust (fine particles) and coarse dust, sufficient performance to catch coarse dust in air can be obtained. In addition, since the air cleaner does not continue to circulate air like a cyclone device, it has low noise level and is suitable for indoor use.

CITATION LIST

Patent Literature

Patent Literature 1: Japanese Unexamined Patent Application Publication No. 2006-263492 (for example, see [0005], [0006] and FIG. 4)

SUMMARY OF INVENTION

Technical Problem

However, since the conventional air cleaner as described in Patent Literature 1 is configured to collect dust in three parts of a dust box, a net filter and a dust-collecting filter, there is a problem that the air cleaner has a complicated structure and requires time and effort for maintenance.

The present invention is intended to solve the above problems. An object of the present invention is to provide an air cleaner having a simple structure and allowing easy maintenance, as well as an air conditioner having an air-cleaning function.

Solution to Problem

An air cleaner of the present invention, having at least one air inlet formed in at least one of left and right side surfaces thereof, comprises: a chassis constituting a casing, and having at least one convex air inlet passage inner peripheral surface formed on at least one of left and right sides of a front surface thereof; an air-sending device provided in the chassis; a filter provided on a front side of the air-sending device; and a front panel detachably mounted to the front surface of the chassis, and having at least one concave air inlet passage outer peripheral surface formed on at least one of left and right sides of a rear surface thereof, wherein an air inlet passage, providing communication between the air inlet and the filter and allowing sucked air to flow therein, is formed between the air inlet passage inner peripheral surface and the air inlet passage outer peripheral surface, wherein the air inlet passage inner peripheral surface and the air inlet passage outer peripheral surface have respective curvatures in a left-right direction, and the curvature of the air inlet passage inner peripheral surface is greater than that of the air inlet passage outer peripheral surface, and wherein the filter is composed of a central filter and side filters each having different catching targets, and the side filters are disposed on side surfaces of the central filter and closer to the respective air inlet passage inner peripheral surfaces than the central filter.

Advantageous Effects of Invention

According to the air cleaner of the present invention, since the filter, which is composed of the central filter and the side filters each having different catching targets, is provided on the front side of the air-sending device, and dust is collected in one part of the air cleaner, a simple structure is achieved.

In addition, since the air inlet passage inner peripheral surface and the air inlet passage outer peripheral surface forming the air inlet passage have different curvatures, and the curvature of the convex air inlet passage inner peripheral surface is greater than that of the concave air inlet passage outer peripheral surface, the central filter and the side filters can each catch particles having different weights. Consequently, frequent clogging of the filter can be suppressed and easy maintenance is allowed.

DESCRIPTION OF EMBODIMENTS

Embodiments of the present invention will be described below with reference to the drawings. The present invention is not limited by the embodiments described below. In the following drawings, relations between sizes of components may be different from actual ones.

Embodiment 1

Figure 1:
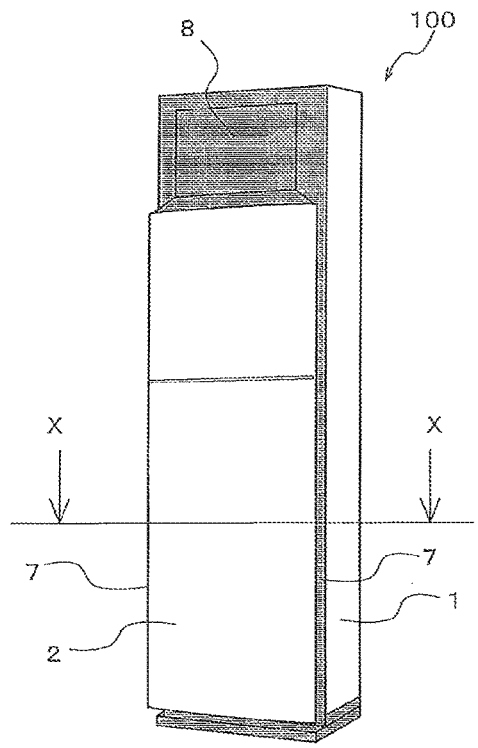
FIG. 1 is a perspective view of an air cleaner according to an embodiment of the present invention.
Figure 2:
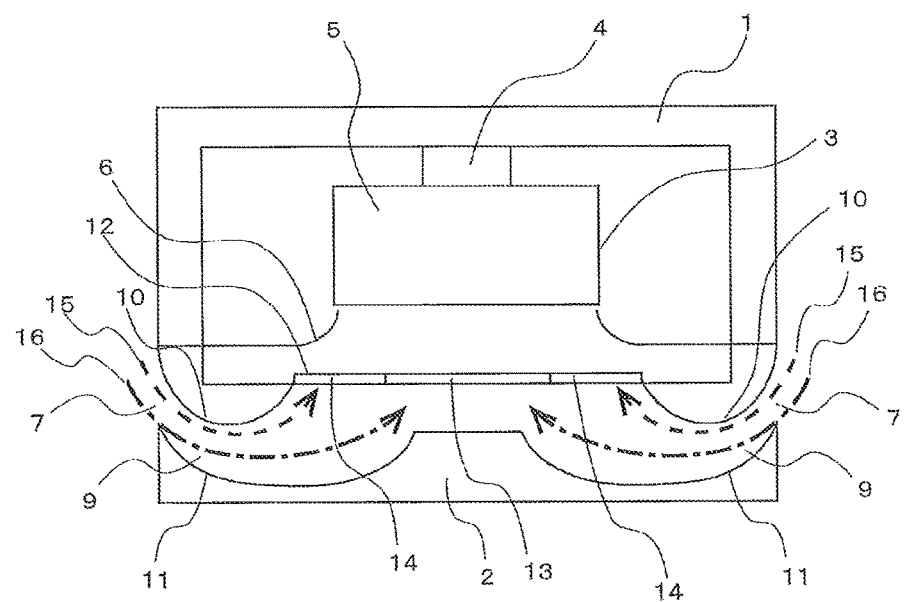
FIG. 2 is an arrow view taken in line X-X in FIG. 1.

FIG. 1 is a perspective view of an air cleaner 100 according to an embodiment of the present invention, and FIG. 2 is an arrow view taken in line X-X in FIG. 1.

Firstly, a structure of the air cleaner 100 according to the embodiment will be described.

Main components of a casing part of the air cleaner 100 according to the embodiment are a chassis 1 in a generally rectangular shape and a front panel 2 detachably mounted to a front surface of the chassis 1, as shown in FIG. 1.

Inside the chassis 1, an air-sending device 3, which includes a motor 4, a fan 5 and a bellmouth 6 as shown in FIG. 2 and circulates air, is provided.

The motor 4 rotationally drives the fan 5 mounted to a rotation shaft thereof (not shown). The fan 5 is rotationally driven by the motor 4 in order to generate an air flow. The bellmouth 6 is provided on a front side (a side from which air is sucked) of the fan 5, and forms an annular wall along a rotation direction of blades (not shown) included in the fan 5 and outside outer peripheral ends of the blades in order to rectify a gas.

Furthermore, air inlets 7 and air inlet passages 9 are formed between the chassis 1 and the front panel 2.

The air inlets 7 are formed in both right and left side surfaces of the air cleaner 100, and air is sucked from the air inlets 7.

Convex air inlet passage inner peripheral surfaces 10 are formed on left and right sides of the front surface of the chassis 1, and concave air inlet passage outer peripheral surfaces 11 are formed on left and right sides of a rear surface of the front panel 2. Air inlet passages 9 are each formed by a region interposed between the air inlet passage inner peripheral surface 10 and the air inlet passage outer peripheral surface 11 on left and right sides, and provide passages through which the air sucked from the air inlets 7 flows.

Furthermore, on an upper side of the front surface of the chassis 1, an air outlet 8 is formed to discharge the sucked air to outside as shown in FIG. 1.

The air inlet passage inner peripheral surface 10 and the air inlet passage outer peripheral surface 11 have respective curvatures in a generally left-right direction as shown in the FIG. 2, and the curvature of the convex air inlet passage inner peripheral surface 10 is greater than that of the concave air inlet passage outer peripheral surface 11. Therefore, the air inlet passage inner peripheral surface 10 constitutes an inner peripheral side of the air inlet passage 9 through which the air sucked from the air inlet 7 flows, while the air inlet passage outer peripheral surface 11 constitutes an outer peripheral side of the air inlet passage 9.

On the front side (the side from which air is sucked) of the air-sending device 3, a filter 12 composed of a central filter 13 and side filters 14 is provided. The central filter 13 is disposed generally at the center in the left-right direction, while the side filters 14 are disposed on both left and right side surfaces of the central filter 13 and closer to the respective air inlet passage inner peripheral surfaces 10 than the central filter 13. The filter 12 and the air inlets 7 are in communication via the respective air inlet passages 9.

The central filter 13 and the side filters 14 have different catching targets. The central filter 13 catches heavy particles such as pollen, while the side filters 14 catch light particles such as fine particles.

In relation to the difference in catching target, it is considered that the central filter 13 and the side filters 14 have different porosities (degrees of coarseness of meshes), in other words, the side filters 14 have a lower porosity (a finer mesh) than that of the central filter 13 so as to be able to catch light particles such as fine particles. However, since a pressure loss is dependent on a porosity of a filter and a velocity of air passing through the filter, the difference in porosity between the central filter 13 and the side filters 14 as described above leads to difference in pressure loss between them, creating imbalance of air volume and large noise.

Thus, in the embodiment, charged filters are used as the side filters 14. The charged filter can selectively catch light particles such as fine particles, provide high initial catching efficiency and reduce degradation of catching efficiency. By using the charged filters as the side filters 14, the side filters 14 and the central filter 13 can be configured with respective meshes having porosities that provide an equivalent pressure loss. In other words, by using the charged filters as the side filters 14, even if the porosity of the side filters 14 is not lower than that of the central filter 13, the side filters 14 can catch light particles such as fine particles, thereby air volume can be ensured without imbalance of air volume and large noise.

Next, operation of the air cleaner 100 according to the embodiment will be described.

When the fan 5 is rotationally driven by driving the motor 4, a negative pressure is generated on a rear side of the filter 12. Thereby, air containing dust is sucked from the air inlets 7 in both left and right side surfaces of the air cleaner 100, and flows in each of the left and right air inlet passages 9. Since light particles in the dust have so small inertia forces as to change their directions along a surface having a large curvature, they are contained in large quantities in air flows 15 along the air inlet passage inner peripheral surfaces 10. On the other hand, as heavy particles in the dust have so large inertia forces as not to change their directions along a surface having a large curvature, they are contained in large quantities in air flows 16 along the air inlet passage outer peripheral surfaces 11.

After the air flows along the air inlet passage outer peripheral surfaces 11 merge generally at the center in the left-right direction, the merged air passes through the central filter 13 and is sucked by the fan 5. At that time, heavy particles, which are contained in large quantities in the air flows along the air inlet passage outer peripheral surfaces 11, are caught by the central filter 13.

On the other hand, the air flows along the air inlet passage inner peripheral surfaces 10 do not merge, pass through the side filters 14 and are sucked by the fan 5. At that time, light particles, which are contained in large quantities in the air flows along the air inlet passage inner peripheral surfaces 10, are caught by the side filters 14.

Furthermore, since the side filters 14 and the central filter 13 are configured with respective meshes having porosities that provide an equivalent pressure loss, air volume can be ensured without imbalance of air volume and large noise.

As mentioned above, according to the air cleaner 100 of the embodiment, the filter 12, which is composed of the central filter 13 and the side filters 14 each having different catching targets, is provided on the front side of the air-sending device 3, and dust is collected in one part of the air cleaner 100, thereby a simple structure is achieved.

In addition, since the air inlet passage inner peripheral surface 10 and the air inlet passage outer peripheral surface 11 forming the air inlet passage 9 have different curvatures, and the curvature of the convex air inlet passage inner peripheral surface 10 is greater than that of the concave air inlet passage outer peripheral surface 11, light particles are caught by the side filters 14 disposed on the side surfaces of the central filter 13, while heavy particles are caught by the central filter 13 disposed generally at the center. Consequently, frequent clogging can be suppressed and easy maintenance is allowed. In addition, since light particles are caught by the side filters 14, inhibition of catching performance for fine particles caused by adhesion of particles other than light particles can be suppressed and an increased lifetime can be achieved.

Furthermore, since imbalance of air flows can be reduced, a loss associated with the air cleaner 100 can be decreased and contribute to energy conservation.

Furthermore, since the air inlets 7 are formed in the sides rather than in the front of the air cleaner 100, excellent design can be achieved. Although in the embodiment the air inlets 7 and the air inlet passages 9 are formed on left and right sides, the present invention is not limited thereto and they may be formed on at least one of the left and right sides.

Furthermore, the present invention can be applied to an air conditioner having an air-cleaning function. The air conditioner is intended to have at least a heat exchanger and to air-condition an air-conditioned space by cooling or heating.

REFERENCE SIGNS LIST

1 chassis 2 front panel 3 air-sending device 4 motor 5 fan 6 bellmouth 7 air inlet 8 air outlet 9 air inlet passage 10 air inlet passage inner peripheral surface 11 air inlet passage outer peripheral surface 12 filter 13 central filter 14 side filter 15 air flow (along the air inlet passage inner peripheral surface) 16 air flow (along the air inlet passage outer peripheral surface) 100 air cleaner

The invention claimed is:

1. An air cleaner having at least one air inlet formed in at least one of left and right side surfaces thereof, comprising:
    a chassis constituting a casing, and having at least one convex air inlet passage inner peripheral surface formed on at least one of left and right sides of a front surface thereof;
    an air-sending device provided in the chassis;
    a filter provided on an upstream side of the air-sending device and on a downstream side of the air inlet; and
    a front panel detachably mounted to the front surface of the chassis, and having at least one concave air inlet passage outer peripheral surface formed on at least one of left and right sides of a rear surface thereof,
    wherein an air inlet passage, providing communication between the air inlet and the filter and allowing sucked air to flow therein, is formed between the air inlet passage inner peripheral surface and the air inlet passage outer peripheral surface,
    wherein the air inlet passage inner peripheral surface and the air inlet passage outer peripheral surface have respective curvatures in a left-right direction, and the curvature of the air inlet passage inner peripheral surface is greater than that of the air inlet passage outer peripheral surface, and
    wherein the filter includes a central filter and side filters each having different catching targets, and the side filters are disposed on side surfaces of the central filter and closer to the air inlet passage inner peripheral surface than the central filter.

2. The air cleaner of claim 1, wherein air flowing along the air inlet passage outer peripheral surface passes through the central filter, and
    air flowing along the air inlet passage inner peripheral surface passes through the side filters.

3. The air cleaner of claim 1, wherein the side filters include charged filters.

4. The air cleaner of claim 3, wherein the side filters and the central filter include respective meshes having porosities that provide a same pressure loss.

5. An air conditioner having an air-cleaning function of the air cleaner of claim 1.

6. The air cleaner of claim 2, wherein the side filters include a charged filter.

7. The air cleaner of claim 6, wherein the side filters and the central filter include respective meshes having porosities that provide a same pressure loss.

\* \* \* \* \*